United States Patent
Gits et al.

(10) Patent No.: US 8,116,299 B2
(45) Date of Patent: Feb. 14, 2012

(54) TECHNIQUES FOR LISTENING TO A CALLER LEAVING A VOICEMAIL MESSAGE IN REAL-TIME AND REAL-TIME PICK UP OF A CALL

(75) Inventors: Peter Gits, Clarendon Hills, IL (US); Dale Seavey, Sunol, CA (US)

(73) Assignee: Cisco Technology, Inc., San Jose, CA (US)

( * ) Notice: Subject to any disclaimer, the term of this patent is extended or adjusted under 35 U.S.C. 154(b) by 1032 days.

(21) Appl. No.: 11/448,279

(22) Filed: Jun. 7, 2006

(65) Prior Publication Data

US 2007/0286355 A1    Dec. 13, 2007

(51) Int. Cl.
*H04L 12/66* (2006.01)
(52) U.S. Cl. .................. 370/352; 379/88.12; 379/88.23
(58) Field of Classification Search .................... 379/70; 455/413
See application file for complete search history.

(56) References Cited

U.S. PATENT DOCUMENTS

| 5,809,128 A | 9/1998 | McMullin |
| 7,680,951 B1 * | 3/2010 | Kulik ............................ 709/238 |
| 2002/0132638 A1 * | 9/2002 | Plahte et al. .................. 455/555 |

OTHER PUBLICATIONS

Mahy, R. "A Call Control Model for SIP", http://ietfreport.isoc.org/all-ids/draft-mahy-sip-cc-models-01.txt; 13 pages, May 2002.

\* cited by examiner

*Primary Examiner* — Melanie Jagannathan
*Assistant Examiner* — Justin N Mullen
(74) *Attorney, Agent, or Firm* — Fish & Richardson P.C.

(57) ABSTRACT

In one embodiment, techniques allow a callee to listen to a caller leaving a voicemail message on a voicemail system. An applications oriented network (AON) device is configured to detect a connection to a voicemail system when a caller calls a callee. A notification message is then sent to the callee that indicates a voicemail message is being left. The callee is presented options in which the callee can decide to listen to the voicemail message in real time as it is being left by the caller. Also, the callee may answer the call from the caller as the voicemail message is being left. The applications oriented network device receives a response indicating whether the callee wants to listen to the voicemail message or not. If the callee wants to listen to the voicemail message, the applications oriented network device sends a copy of the voicemail message being left by the caller as it is being received from the caller.

20 Claims, 5 Drawing Sheets

TECHNIQUES FOR LISTENING TO A CALLER LEAVING A VOICEMAIL MESSAGE IN REAL-TIME AND REAL-TIME PICK UP OF A CALL

BACKGROUND OF THE INVENTION

Embodiments of the present invention generally relate to telecommunications and more specifically to techniques for allowing a callee to listen to a caller's voicemail message while the caller is leaving the voicemail message.

When a caller calls a callee at an end device and the callee does not answer the call, the caller is re-directed to a voicemail system for the callee. Once the call is re-directed to the voicemail system, the end device is removed from the call flow. For example, a callee cannot listen to the voicemail message being left by the caller and cannot answer the call using the end device once it is re-directed to the voicemail system. This is because the voicemail system is a separate system from the end device.

A feature allows a callee that is using the end device when the call is received to listen to a voicemail message as it is being left while on another call. Thus, the callee may be on another call with a second caller while listening to the voicemail. This is very confusing in that the callee hears the voicemail message being left and also hears anything the second caller is saying in the conversation. In this case, the voicemail system sends the voicemail message to the callee as it is being left. This uses resources of the voicemail system that might not be available. For example, if the voicemail system has to handle multiple voicemail calls for other users and also has to send the messages to callees, a voicemail system's resources may become exhausted. Also, the callee can only listen to the voicemail message if the callee is currently using the end device when the caller calls. If the callee is not using the end device, the callee will not be notified and the voicemail message will just be left by the caller.

DETAILED DESCRIPTION OF EMBODIMENTS OF THE INVENTION

In one embodiment of the present invention, a callee can listen to a caller leaving a voicemail message on a voicemail system. An applications oriented network (AON) device is configured to detect a connection to a voicemail system when a caller calls a callee. A caller may call a callee at the callee's telephone number or any other address. If the callee does not pick up the call, then the call is re-directed to the callee's voicemail system.

A notification message is then sent to the callee that indicates a voicemail message is being left. The notification may be sent to the callee at a different end device from which was called. The callee is presented with an option to listen to the voicemail message in real-time as it is being left by the caller. Also, another option is presented where the callee may answer the call from the caller as the voicemail message is being left.

The applications oriented network device receives a response indicating whether the callee wants to listen to the voicemail message or not. If the callee wants to listen to the voicemail message, the applications oriented network device sends a copy of the voicemail message being left by the caller as it is being received from the caller. Accordingly, the callee can listen to the voicemail message as it is being left. Further, the callee may decide to answer the call at any point. The applications oriented network device then facilitates connecting the callee to the caller.

Figure 1:
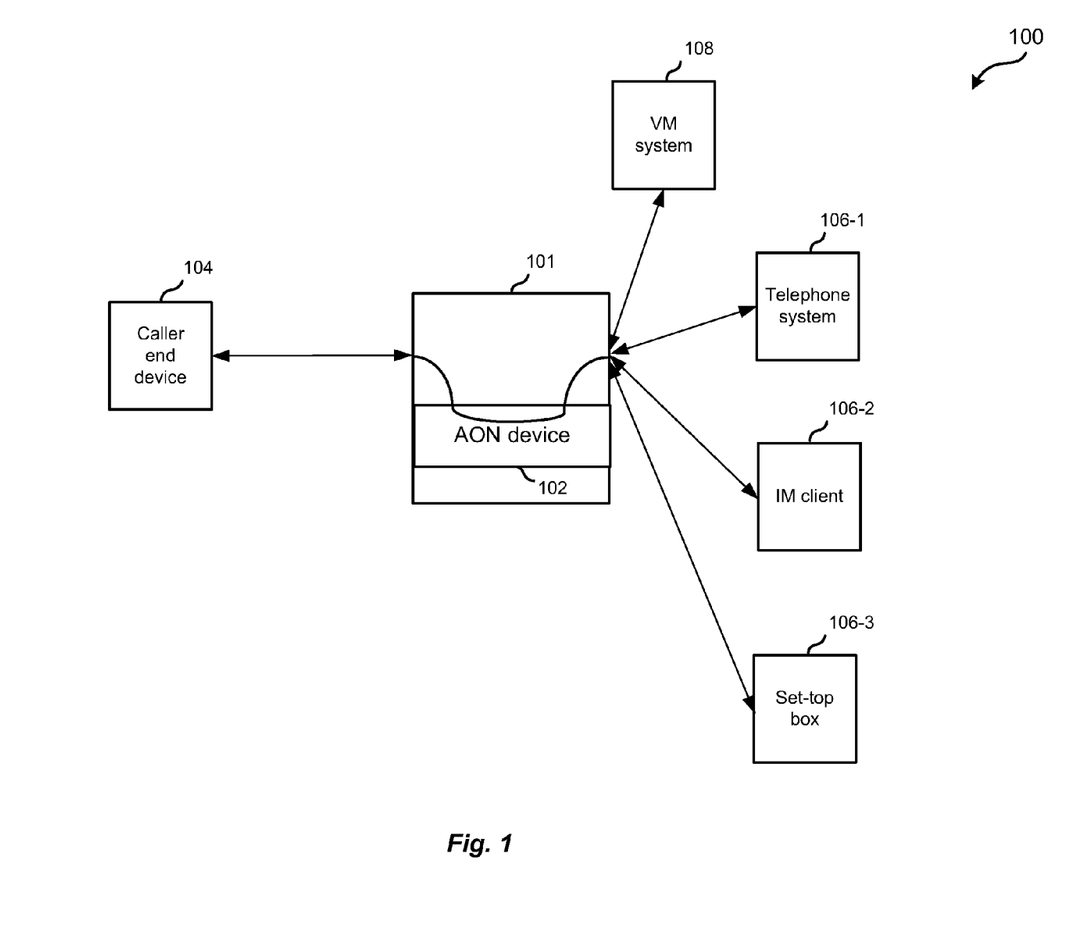
FIG. 1 depicts one embodiment of a system for allowing a callee to listen to a caller leaving a voicemail message on a voicemail system according to embodiments of the present invention.

FIG. 1 depicts one embodiment of a system 100 for allowing a callee to listen to a voicemail message being left on a voicemail system according to embodiments of the present invention. As shown, a router 101, an applications oriented network device 102, a caller end device 104, callee end devices 106, and a voicemail system 108 are provided.

Router 101 may be a network device configured to route communications. For example, router 101 may be a proxy, switch, router, back to back user agent (B2BUA), etc. Router 101 may be part of a signaling and media path between caller end device 104 and callee end devices 106 for a telephone call. A telephone call may be any voice communication, such as a voice over Internet protocol (VoIP) communication, public switched network (PSTN) communication, etc. Router 101 is configured to be in a signaling path used to set up a call from caller end device 104 to callee end device 106. For example, router 101 may terminate the signaling and media streams. In this case, router 101 may be seen as a participant in a call by end device 104 and end devices 106. Router 101 is registered and provisioned as part of the path and is also included in as a via (part of a hop) for the signaling and media streams.

AON device 102 may be a network device that receives call signaling and media from router 101. As shown AON device 102 is part of router 101. For example, AON device 102 may be a blade in router 101. In another embodiment, AON device 102 may be part of another router (not shown). In either case, call signaling and media streams may be redirected to AON device 102 by router 101.

Caller end device 104 and callee end devices 106 may be any telecommunication devices. For example, end devices may include VoIP telephones, PSTN telephones, soft phones, voice-enabled IM clients, personal digital assistants, laptop computers, set-top boxes, etc.

Voicemail system 108 may be any voicemail system. In one embodiment, voicemail system 108 may be different from a physical answering machine. An answering machine is configured to be physically connected to a callee's telephone and can receive the call from the caller. For example, the answering machine lies in between a port and a telephone, and can intercept a call for the callee. However, a voicemail system resides remotely from the callee and is typically serviced by a service provider, such as a telecommunications company. When a call is re-directed to voicemail system 108, a callee's end device 106 is removed from the call flow and a connection between caller end device 104 and voicemail system 108 is provided. Callee end device 106 is thus not a party to the call to voicemail system 108.

AON device 102 is configured to allow a callee to listen to a caller's voicemail message that is being left on voicemail system 108. For example, caller end device 104 may call callee end device 106-1. In one example, a caller may call a telephone number, such as 415-555-5555, or a VoIP number, such as callee@cisco.com.

AON device 102 receives a call request from router 101 for the call from caller end device 104. In one embodiment, AON device 102 then sends the call request to a call proxy (not shown) that is configured to send the invite to callee end device 106-1. The call request may be any signaling for routing a call, such as a SIP INVITE message. The call proxy may be a gateway or any other network device that is associated with callee end device 106-1 and routes signaling and media to callee end device 106-1. When the call is not answered by the callee, the call proxy sends an INVITE message to voicemail system 108. The call proxy then drops out of the call after sending the INVITE message.

Voicemail system 108 receives the INVITE request and sends a confirmation, such as an OK message to router 101, which redirects it to AON device 102. AON device 102 determines the call has been re-direction to voicemail system 108 and then notifies the callee that a voicemail message is being left by the caller. AON device 102 may determine the call has been re-directed because the OK message has been received from voicemail system 108 instead of callee end device 106-1.

AON device 102 may send a notification to another end device 106 for the callee, such as end device 106-2 or end device 106-3. The other end device 106 may be a device that a callee may be using currently, such as an IM client or a set-top box. For example, the callee may be at home and watching television using the set-top box or at work and logged on an instant message client while the call is to the callee's home phone. Even though the call is to callee end device 106-1, AON device 102 may also send a notification to callee end device 106-1. However, it may be expected that since the callee did not pick up end device 106-1, then the callee may not be available on that end device. However, it may be that the callee wants to monitor calls so the notification is sent to end device 106-1.

In one embodiment, AON device 102 may use presence information to determine where to send the notification. For example, if the callee is active on an IM client, then AON device 102 sends a notification to the IM client.

Upon receiving the notification, end device 106-2 may render an interface for the callee. The interface may provide options for the callee, such as the option of listening to the voicemail message as it is being left or the option to answer the call. The callee can then select the option desired, such as listening to the voicemail message.

AON device 102 receives a copy of the voicemail message that is being left on voicemail system 108 from router 101. For example, as a real-time protocol (RTP) media stream is received, router 101 copies it, sends it to AON device 102, and AON device 102 redirects it to the callee. The copy may be sent to the callee in real-time. Thus, the callee can listen to the voicemail message as it is being left.

While listening to the message, the callee may decide to answer the call. In this case, AON device 102 receives a response from the callee indicating the callee wants to answer the call. AON device 102 then facilitates the re-direction of the call from voicemail system 108 to end device 106-2. This is performed using signaling, which will be described in more detail below.

AON device 102 is in the control signaling path but does not appear as a proxy of the voicemail system 108, voicemail system 108, or end devices 104/106 as a participant in the call. A protocol, such as web caching content protocol (WCCP), may be used to route the control signaling stream through AON device 102 without the existing participant's knowledge (e.g., the proxy, voicemail system 108, and end devices 104/106 are unaware of the existence of AON device 102). Additionally, AON device 102 is not directly configured in the media path, that is, it does not terminate the media stream. This is different from a back to back user agent (B2BUA), which terminates a media and control signaling stream. The B2BUA is in the path and is part of a via address for packets sent in the control signaling stream and media stream. The B2BUA is also seen as a participant in the call and is considered a hop in the routing of the media and control signaling stream. However, AON device 102 subscribes to router 101 for control signaling and media that is being sent to the voicemail system 108 and gets a copy of the media streams from router 101. Having this copy allows AON device 102 to redirect the pertinent media streams for a voicemail to the callee end devices 106 and to initiate call pick-up.

By not being configured in the path, AON device 102 does not need to be registered (or included by a DNS srv record) or provisioned as part of the path. In this case, administrators do not need to configure system 100 to route calls through AON device 102. This may simplify the redirecting of voicemail messages and the call pick-up by AON device 102.

AON device 102 may be compatible with any end devices 104 and 106 and voicemail systems 108 regardless of the protocol used by voicemail system 108, caller end device 104, and/or callee end device 106. The protocol used by voicemail system 108 and various callee end devices 106 may be different. However, AON device 102 can be configured to translate between protocols. Adapters may be provided to allow communications between different protocols. In contrast, voicemail systems 108 are conventionally compatible with one protocol and/or type of end device. Thus, voicemail systems cannot communication with multiple end devices. AON device 102 may communicate with any IM client using Extensible Messaging and Presence Protocol (XMPP), SIMPLE, or any other IM protocol. Also, AON device 102 may communicate with telephones using SIP.

Figure 2:
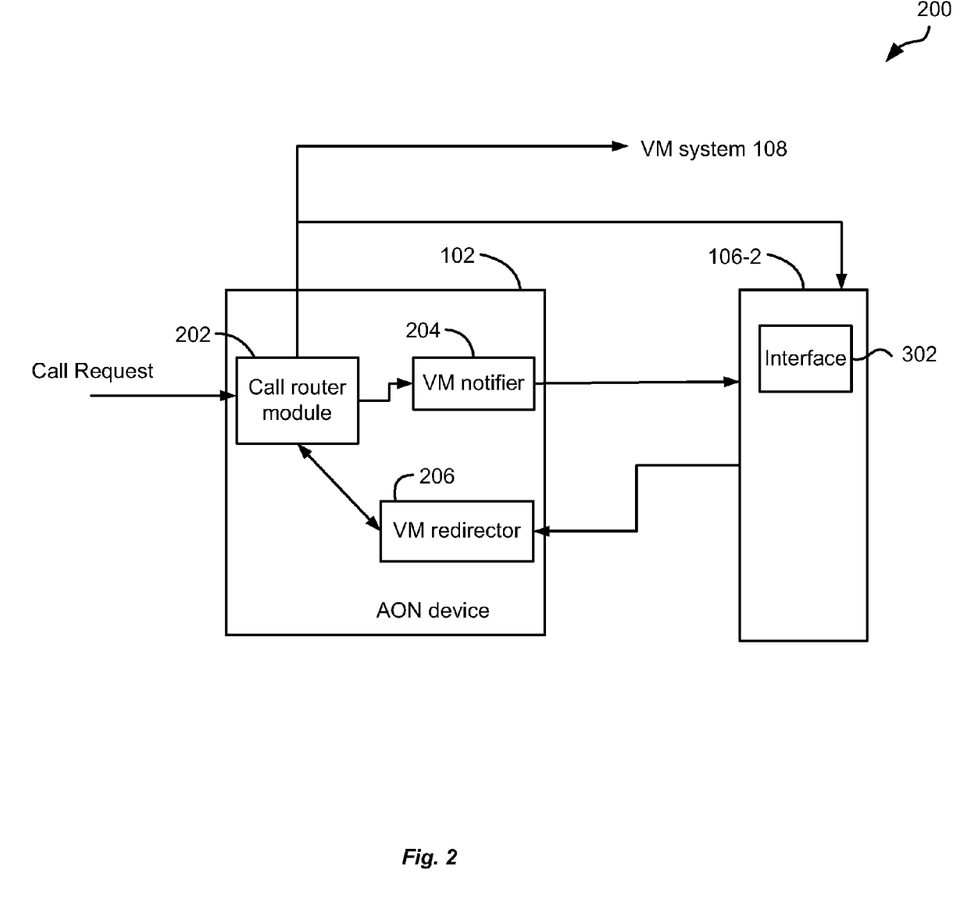
FIG. 2 depicts a more detailed embodiment of the system according to embodiments of the present invention.

FIG. 2 depicts a more detailed embodiment of system 100 according to embodiments of the present invention. AON device 102 includes a call router module 202, a voicemail notifier 204, and a voicemail redirector 206.

Call router module 202 receives a call request (e.g., INVITE message) from caller end device 104. Call router module 202 may route the call request to callee end device 106-1 (not shown). When it is determined that the callee did not answer the request, a proxy (not shown) may re-direct the call to voicemail system 108. Call router module 202 detects the re-direction and re-directs the call to voicemail system 108.

After re-direction to voicemail system 108, a voicemail notifier 204 is configured to generate a notification message for the callee. In one embodiment, voicemail notifier 204 inspects information received in the call request from caller end device 104. For example, voicemail notifier 204 may inspect control information received in control packets for the call. From this information, identifying information for the caller and callee may be determined. This may be a set of ports in the control plane and a dynamic set of ports for the media to be sent (the RTP streams).

Voicemail notifier 204 then determines the callee that is being called from the callee information. Presence information may then be determined for the callee. The presence information may be collected and stored by AON device 102. For example, if the callee is online on an IM client end device 106-2 or is watching television using set-top box end device 106-3, it may be determined that the notification should be sent to one or more of those devices.

Voicemail notifier 204 then generates a notification message and sends it to the callee at the determined end device 106. For example, an IM popup menu message may be sent to an instant message username for the callee.

Figure 3:
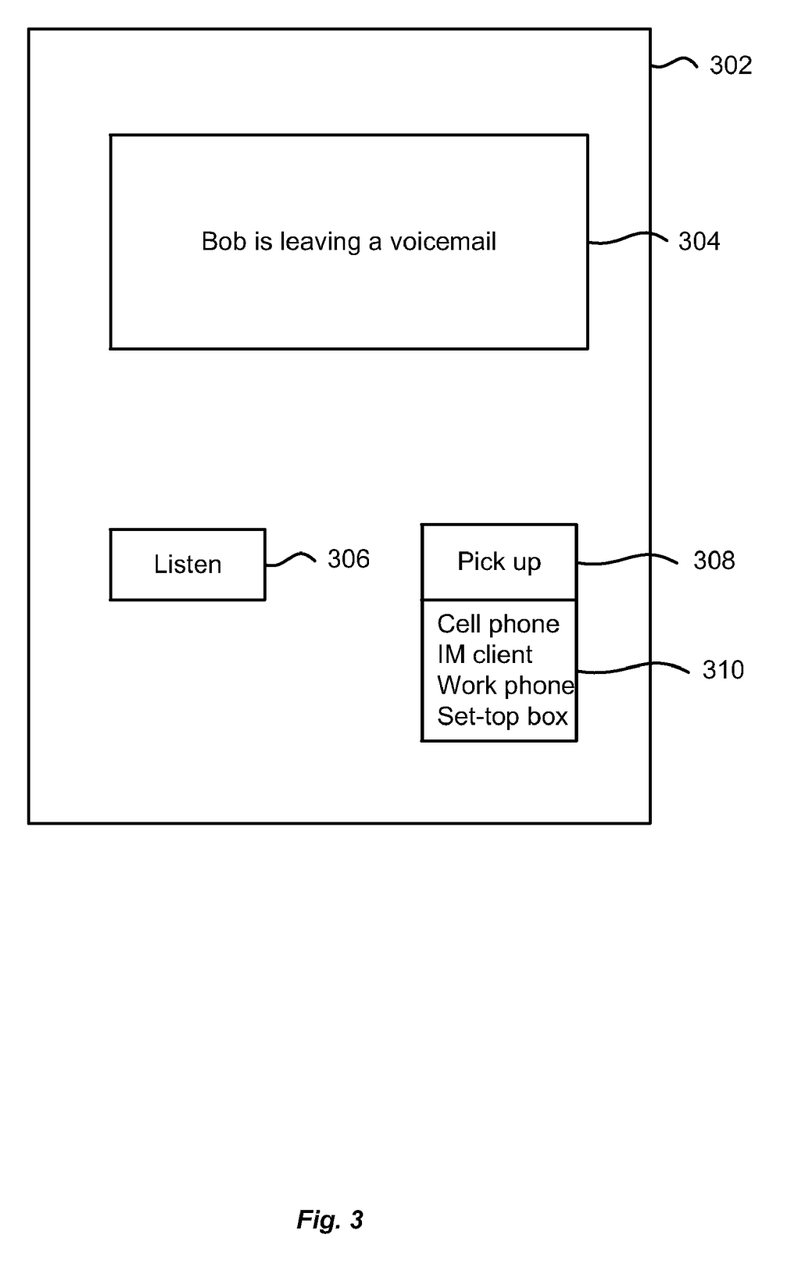
FIG. 3 depicts an example of an interface that may be rendered according to one embodiment of the present invention.

The notification causes a graphical user interface (or any other interface) to be rendered on end device 106-2. FIG. 3 depicts an example of an interface 302 that may be rendered according to one embodiment of the present invention. Although this interface is described, it will be recognized that other interfaces may be appreciated. For example, text-based interfaces, interactive voice response interfaces, etc. may be provided.

As shown, a section 304 shows a message, such as "Bob is leaving a voicemail." Also, a button 306 and a button 308 are provided with options that a callee can have performed. Buttons 306 and 308 may be any mechanism that allows a callee to select the option. For example, the button may be a physical button, virtual button, etc. Also, the callee may use voice commands or any other mechanism to select an option.

In one embodiment, the option for button 306 allows the callee to listen to the voicemail message as it is being left by the caller. The option for button 308 allows the callee to pick up the call from the caller as the caller is leaving the voicemail message. As shown, a drop-down menu 310 is provided for button 308 that allows the callee to select where the call from the caller should be re-directed. For example, the call may be re-directed to a cell phone, IM client, work phone, set-top box, etc.

Referring back to FIG. 2, a response from end device 106-2 is received at a voicemail redirector 206. Voicemail redirector 206 then notifies call router module 202 to route a copy of information received for the voicemail message from the caller to end device 106-2.

Because AON device 102 is in the control plane and media stream for the call in the network, the forking of the voicemail message to end device 106 is provided in an efficient manner. For example, when the response indicating the callee wants to listen to the voicemail message is received, all packets that are destined for a particular voicemail box (that is, the callee's) are copied and delivered to end device 106-2. Call router module 202 may determine which packets are destined for the callee's voicemail box by interrogating the session description protocol (SDP) or multi-purpose internet mail extensions (MIME) information that is received with the packets redirected from router 101. Thus, call router module 202 can distinguish between packets that are received for the callee's voicemail box from other calls that are being routed by AON device 102.

The packets for the media stream are delivered to end device 106-2, which can then use a media player or any other mechanism to play the voicemail message. The forking is performed until the voicemail message has been left, such as when the caller hangs up or completes the voicemail.

If end device 106-2 indicates the callee wants to answer the call from caller end device 104 during the voicemail, voicemail redirector 206 notifies call router module 202. Because AON device 102 is in the control plane and media stream, AON device 102 may facilitate connecting end device 106-2 with caller end device 104. For example, call router module 202 may send a message to end device 106-2 with a request to transfer the call that is taking place between caller end device 104 and voicemail system 108 to callee end device 106-2. In one embodiment, the message may be sent to a call proxy for end device 106-2. The call proxy may then facilitate sending the message to end device 106-2 as is known in the art. The message sent to end device 106-2 is sent as if it is sent from voicemail system 108. Thus, it is akin a new call sent from voicemail system 108 to end device 106-2.

When that call is accepted, call router module 202 is configured to connect caller end device 104 and callee end device 106-2. When the connection is made to callee end device 106-2, call router module 202 may send a control message that ends the session with voicemail system 108. Thus, voicemail system 108 drops out of the call gracefully and the call continues with caller end device 104 and callee end device 106-2. For example, the call is ended with voicemail system 108 such the voicemail system 108 thinks caller end device 104 ended the call (e.g., hung up). Also, it appears to the proxy that voicemail 108 has transferred the call. Although this method of connecting to callee end device 106-2 is described, it will be understood that other methods may be appreciated.

When the callee requests to pick up the call, voicemail redirector 206 may send a message to the caller indicating that his/her call is being picked up. For example, the message may state "Your call is being picked up now; please hold while the callee answers the call." This message may be sent because, in some embodiments, when a call is initiated with the callee, caller end device 104 may hear ringing for the new call. Thus, without the message, the caller may not understand what is happening. In other embodiments, the ringing may be suppressed by call router module 202.

Figure 4:
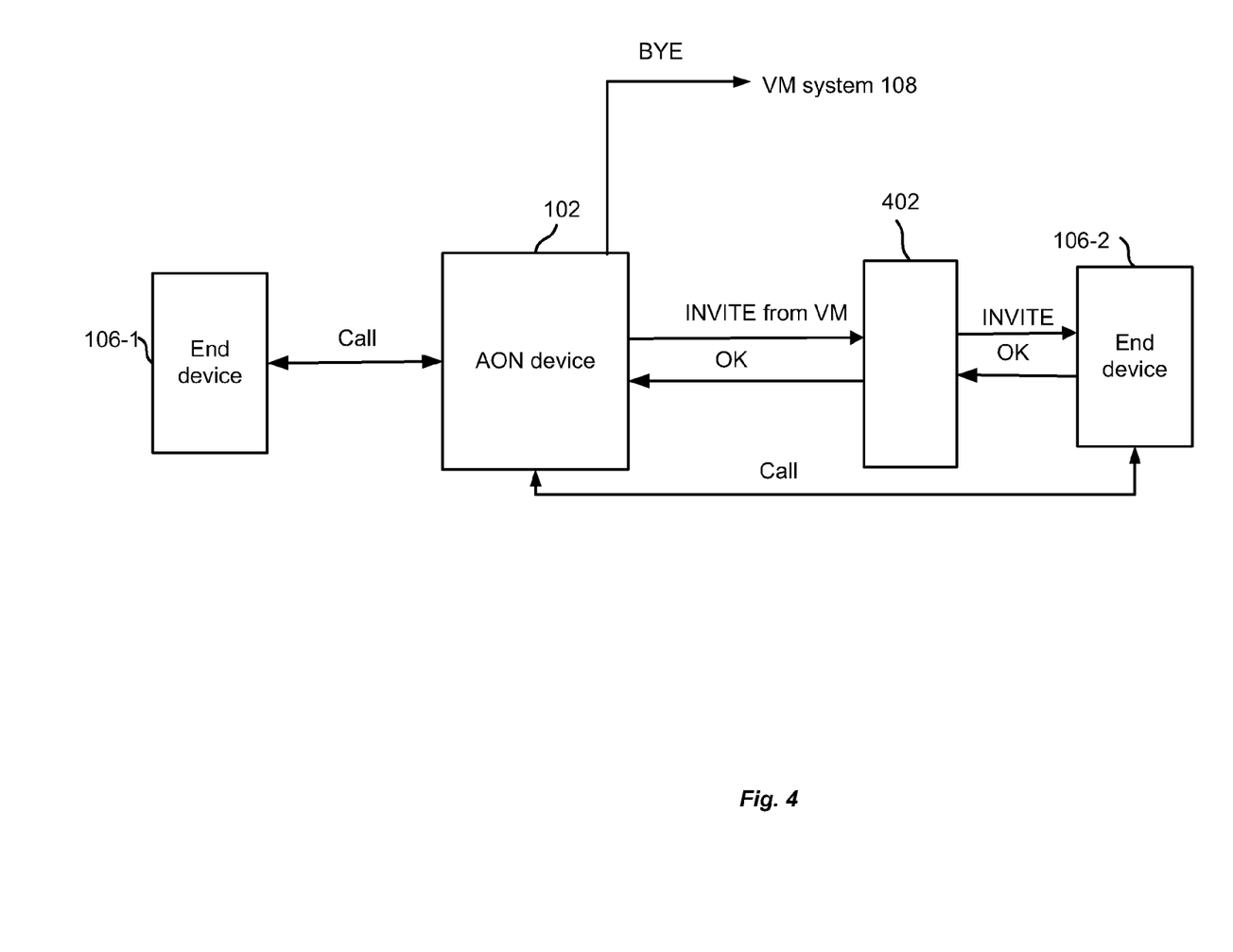
FIG. 4 shows a system for allowing a callee to pick up a call from a caller end device according to one embodiment of the present invention.

FIG. 4 shows signaling for allowing a callee to pick up a call from caller end device 104 according to one embodiment of the present invention. In one embodiment, the messages sent may be SIP messages. However, other protocols may be used. When the call is going to be picked up, AON device 102 sends an INVITE message for end device 106-2. In one embodiment, the INVITE message may be a message that is made to look like it is from voicemail system 108. Proxy 402 may be included in the network and may be configured to receive messages for end device 106-2. Proxy 402 receives the INVITE message and forwards it to end device 106-2.

Once the call is picked up, an OK message is sent to proxy 402. The OK message indicates that the call has been picked up. The OK message is then forwarded to AON device 102.

The call is then set up between caller end device 104 and callee end device 106-2. In this case, proxy 402 may drop out of the call and AON device 102 routes the media from end device 104 to callee end device 106 as it is redirected by router 101. Also, AON device 102 may also end the session with voicemail system 108.

Figure 5:
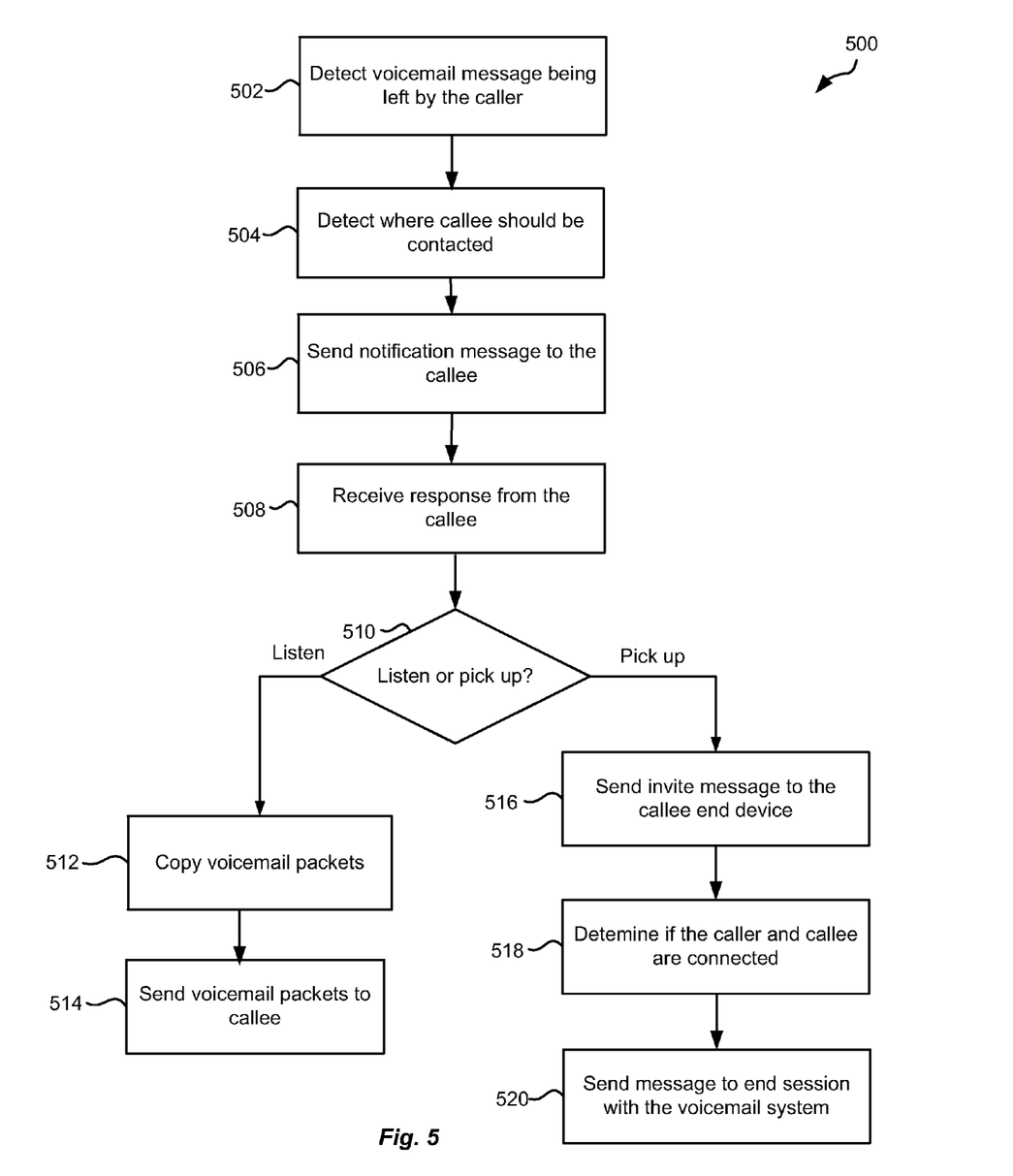
FIG. 5 depicts a simplified flow chart of a method for allowing the callee to listen to a voicemail message while it is being left by the caller according to one embodiment of the present invention.

FIG. 5 depicts a simplified flow chart 500 of a method for allowing the callee to listen to a voicemail message while it is being left by the caller according to one embodiment of the present invention. Step 502 detects a voicemail message being left by a caller. In this case, the call is being re-directed to voicemail system 108.

Step 504 determines where a callee should be contacted. For example, presence information may be determined where a callee is online or active. Also, preferences may be set by a callee that are used to determine where the callee should be contacted.

Step 506 sends a notification message to the callee. The notification message may cause an interface to be outputted for the callee.

Step 508 receives a response from the callee. The response may indicate whether the callee wants to listen to the voicemail message being left in real-time or if the callee wants to pick up the call.

Step 510 determines if the response indicated the callee wanted to pick up the call or listen to the voicemail message. If the callee wants to listen to the voicemail message, step 512 copies voicemail packets for the voicemail message being left. Step 514 then sends the voicemail packets to callee end device 106.

If the callee wants to pick up the call, step 516 sends an invite message to callee end device 106-2. Step 518 determines if the caller and the callee are connected. When the caller and callee are connected, step 520 sends a message ending the session with voicemail system 108. Thus, the callee has successfully been connected with the caller.

Embodiments of the present invention may be used in many examples. For example, a callee may be watching television using a set-top box. When a call is received at the callee's business or enterprise phone number, and the call is re-directed to voicemail system 108, and a notification is sent to the callee's set-top box.

The set-top box can then display an interface stating that a voicemail message is being received and provide the callee options to pick up the telephone call or to listen to the voicemail message being left. The callee may then use a controller to select which option is desired. Thus, the callee may listen to the voicemail message through his/her television and set-top box.

Also, the callee may decide to answer the call. The callee selects which device the call should be answered with, such as the callee's cellular phone, the set-top box itself, or any other device. The call is then routed to that device.

Embodiments of the present invention provide many advantages. For example, because AON device 102 is in a media and control signaling path in the network, the forking of the media packets for the voicemail message may be performed without using resources of voicemail system 108. Also, because a proxy 402 and/or callee end device 106 does not know how to connect to the call between caller end device 104 and voicemail system 108 after it is redirected, having AON device 102 in the signaling and media path allows a callee to listen to the voicemail message or pick up the call while the voicemail message is being left.

Also, scalability is provided in that AON devices 102 may be easily added to the network and adapted to work with various protocols. However, it may not be desirable to add additional voicemail systems if the current system has enough mailboxes for the users of an organization. Further, voicemail systems must be integrated with the telephones and proxies for all the devices. This does not scale well as voicemail systems are typically not configured to initiate communications with devices. Thus, many man hours of manual configuration is needed.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:
receiving, at a network device, a call request from a first end device associated with a caller to a second end device associated with a callee;
re-directing the call request, using the network device and based on a determination that the second end device did not answer the call request, to a voicemail system;
detecting, at the network device, the re-direction of the call request to the voicemail system;
extracting, at the network device, identification for the caller and the callee by inspecting information received in the call request and constructing, based on the identification, a notification message for the callee, the notification message including the identification of the caller;
monitoring, at the network device, activity information of the callee at one or more end devices associated with the callee, and determining, based on the monitored activity information of the callee, that the callee is actively engaged at a third end device at the time the caller is leaving a voicemail message for the callee;
sending, using the network device, the notification message to the third end device, where the notification message includes an indication that a voicemail message is being left by the caller and provides a first option to listen to the voicemail message and a second option to answer the call using at least one end device selected from a group including the second end device and the third end device that are associated with the callee;
determining, at the network device, and based on receiving a response from the third end device, an option selected by the callee; and
sending, from the network device and based on the determination that the callee selected the first option, a copy of the voicemail message to the third end device, as it is received at the voicemail system, with the network device performing signaling translation for the voicemail message from the signaling protocol used by the voicemail system to the signaling protocol used by the third end device.

2. The method of claim 1, further comprising:
receiving, at the network device, a response from the third end device indicating that the callee has selected the second option from the notification message;
determining, at the network device and based on the received response, that the callee wants to answer the call from the caller while the caller is leaving the voicemail message; and
facilitating a connection between the first end device of the caller and the end device of the callee, where the end device of the callee is selected by the callee, as part of the second option from the notification message, from a group including the second end device and the third end device.

3. The method of claim 2, wherein facilitating the connection comprises:
sending a connect message for the device associated with the callee, wherein the caller and the device are connected.

4. The method of claim 3, wherein the connect message is sent by the network device on behalf of the voicemail system with a request to transfer the call to the callee.

5. The method of claim 2, further comprising ending a session between the caller and the voicemail system upon facilitating the connection between the caller and the callee.

6. The method of claim 1, further comprising:
providing a list of devices to the callee in which the callee can be connected; and
receiving a response from the callee indicating a selection of a selected device, wherein the caller is connected to the selected device.

7. The method of claim 1, wherein sending the notification message comprises sending the notification message to a first address for the callee that is different from a second address that is initially called by the caller.

8. The method of claim 1, further comprising:
receiving a call request from the caller;
routing the call request to the callee; and
routing the call request to the voicemail system if the call request is not answered by the callee, wherein the notification message is sent to the callee upon routing the call request to the voicemail system.

9. The method of claim 1, wherein the network device is not included as a participant in the call as perceived by a caller end device and the voicemail system.

10. The method of claim 9, wherein the network device is not identified in packets for the voicemail message as a terminating device for the voicemail message.

11. A network device comprising:
a detector module including a processor configured to detect a connection to a voicemail system for a call request from a first end device associated with a caller to a second end device associated with a callee;
a notifier module including a processor configured to:
extract identification for the caller and the callee by inspecting information received in the call request and construct, based on the identification, a notification message for the callee, the notification message including the identification of the caller;
monitor activity information of the callee at one or more end devices associated with the callee, and determine, based on the monitored activity information of the callee, that the callee is actively engaged at a third end device at the time the caller is leaving a voicemail message for the callee; and
send the notification message to the third end device, where the notification message includes an indication that a voicemail message is being left by the caller and provides a first option to listen to the voicemail message and a second option to answer the call using at least one end device selected from a group including the second end device and the third end device that are associated with the callee;
a redirector module including a processor configured to determine, based on receiving a response from the third end device, an option selected by the callee; and
a call router module including a processor configured to send, based on the determination that the callee selected the first option, a copy of the voicemail message to the third end device as it is received at the voicemail system, performing signaling translation for the voicemail message from the signaling protocol used by the voicemail system to the signaling protocol used by the third end device.

12. The network device of claim 11, wherein the redirector module is configured to:
receive a response from the third end device indicating that the callee has selected the second option from the notification message; and
determine, based on the received response, that the callee wants to connect to the caller while the caller is leaving the voicemail message,
wherein the call router module is configured to facilitate the connection between the first end device associated with the caller and the end device of the callee, where the end device of the callee is selected by the callee, as part of the second option from the notification message, from a group including the second end device and the third end device.

13. The network device of claim 12, wherein the call router module is configured to send a connect message for the device associated with the callee, wherein the caller and the device are connected.

14. The network device of claim 13, wherein call router module is configured to send the connect message on behalf of the voicemail system with a request to transfer the call to the callee.

15. The network device of claim 12, wherein the call router module is configured to end a session between the caller and the voicemail system upon facilitating the connection between the caller and the callee.

16. The network device of claim 11, wherein the notifier module is configured to provide a list of devices to the callee in which the callee can be connected,
wherein the redirector module is configured to receive a response from the callee indicating a selection of a selected device, wherein the caller is connected to the selected device.

17. The network device of claim 11, wherein the notifier module is configured to send the notification message to a first address for the callee that is different from a second address that is initially called by the caller.

18. The network device of claim 11, wherein the network device is not included as a participant in the call as perceived by a caller end device and the voicemail system.

19. The network device of claim 18, wherein the network device is not identified in packets for the voicemail message as a terminating device for the voicemail message.

20. A non-transitory machine-readable medium including instructions executable by a processor and configured to cause the processor to perform functions comprising:
detecting, at a network device, a connection to a voicemail system for a call request from a first end device associated with a caller to a second end device associated with a callee;
extracting, at the network device, identification for the caller and the callee by inspecting information received in the call request and constructing, based on the identification, a notification message for the callee, the notification message including the identification of the caller;
monitoring, at the network device, activity information of the callee at one or more end devices associated with the callee, and determining, based on the monitored activity information of the callee, that the callee is actively engaged at a third end device at the time the caller is leaving a voicemail message for the callee;
sending, using the network device, the notification message to the third end device, where the notification message includes an indication that a voicemail message is being left by the caller and provides a first option to listen to the voicemail message and a second option to answer the call using at least one end device selected from a group including the second end device and the third end device that are associated with the callee;
determining, at the network device and based on receiving a response from the third end device, an option selected by the callee; and sending, from the network device and based on the determination that the callee selected the first option, a copy of the voicemail message to the third end device, as it is received at the voicemail system, with the network device performing signaling translation for the voicemail message from the signaling protocol used by the voicemail system to the signaling protocol used by the third end device.

* * * * *